(12) United States Patent
Steinmetz et al.

(10) Patent No.: US 12,111,731 B2
(45) Date of Patent: Oct. 8, 2024

(54) COOPERATIVE MEMORY SUBSYSTEM DATA RECOVERY

(71) Applicant: Micron Technology, Inc., Boise, ID (US)

(72) Inventors: Joseph Harold Steinmetz, Loomis, CA (US); William Richard Akin, Morgan Hill, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 18/474,046

(22) Filed: Sep. 25, 2023

(65) Prior Publication Data
US 2024/0012713 A1      Jan. 11, 2024

Related U.S. Application Data

(63) Continuation of application No. 17/841,106, filed on Jun. 15, 2022, now Pat. No. 11,803,444.

(51) Int. Cl.
*G06F 11/14*      (2006.01)

(52) U.S. Cl.
CPC .... *G06F 11/1415* (2013.01); *G06F 2201/805* (2013.01)

(58) Field of Classification Search
CPC ........................ G06F 11/1415; G06F 2201/805
See application file for complete search history.

(56) References Cited

U.S. PATENT DOCUMENTS

| | | | |
|---|---|---|---|
| 5,848,230 A | 12/1998 | Walker | |
| 7,302,603 B2 * | 11/2007 | Nielsen | G06F 11/1076 714/6.12 |
| 10,089,191 B2 | 10/2018 | Mckelvie et al. | |
| 10,503,416 B1 | 12/2019 | Himelstein et al. | |
| 10,860,508 B2 * | 12/2020 | Bolkhovitin | G06F 13/1668 |
| 11,705,216 B2 * | 7/2023 | Hieb | G06F 3/0646 365/200 |
| 2011/0320869 A1 | 12/2011 | Gower et al. | |
| 2012/0185437 A1 * | 7/2012 | Pavlov | G06F 16/182 707/652 |

(Continued)

FOREIGN PATENT DOCUMENTS

WO      WO-2012068184 A1 *   5/2012   .......... G06F 11/1433

OTHER PUBLICATIONS

Notice of Allowance, U.S. Appl. No. 17/841,106, Jun. 28, 2023, 20 pages.

*Primary Examiner* — Matthew M Kim
*Assistant Examiner* — Indranil Chowdhury
(74) *Attorney, Agent, or Firm* — NICHOLSON DE VOS WEBSTER & ELLIOTT LLP (57) ABSTRACT

Exemplary methods, apparatuses, and systems include detecting a failure of a first memory subsystem of a plurality of memory subsystems. A first recovery instruction is sent to a second memory subsystem of the plurality of memory subsystems. The first recovery instruction directs the second memory subsystem to recover a first subset of data stored by the first memory subsystem. A second recovery instruction is sent to a third memory subsystem of the plurality of memory subsystems. The second recovery instruction directs the third memory subsystem to rebuild a second subset of data stored by the first memory subsystem. The first and second subsets of data differ from one another.

20 Claims, 7 Drawing Sheets

(56) References Cited

U.S. PATENT DOCUMENTS

| | | |
|---|---|---|
| 2016/0239397 A1 | 8/2016 | Thomas et al. |
| 2017/0097875 A1 | 4/2017 | Jess et al. |
| 2017/0168908 A1 | 6/2017 | Abali et al. |
| 2018/0322023 A1 | 11/2018 | Subrahmanyam et al. |
| 2018/0341606 A1* | 11/2018 | Bolkhovitin .......... G06F 3/0656 |
| 2019/0227886 A1 | 7/2019 | Glancy et al. |
| 2019/0324868 A1* | 10/2019 | Shivanna ............ G06F 12/0284 |
| 2020/0026606 A1 | 1/2020 | Farnum et al. |
| 2020/0065204 A1 | 2/2020 | Springberg |
| 2020/0349008 A1* | 11/2020 | Dawkins .............. G06F 11/1438 |
| 2020/0356484 A1* | 11/2020 | Subbarao ............... G11C 11/413 |
| 2021/0011806 A1 | 1/2021 | Berke et al. |
| 2021/0109826 A1 | 4/2021 | Bueb et al. |
| 2021/0157510 A1 | 5/2021 | Bavishi et al. |
| 2021/0191852 A1 | 6/2021 | Muchherla et al. |
| 2022/0300174 A1 | 9/2022 | Bert |
| 2022/0300372 A1 | 9/2022 | Bert |
| 2022/0300377 A1 | 9/2022 | Bert |
| 2022/0374305 A1 | 11/2022 | Yeap et al. |
| 2023/0214298 A1* | 7/2023 | Bhardwaj ............ G06F 9/30029 711/103 |

* cited by examiner

COOPERATIVE MEMORY SUBSYSTEM DATA RECOVERY

CROSS-REFERENCE TO RELATED APPLICATION

The present application is a continuation of U.S. patent application Ser. No. 17/841,106 filed Jun. 15, 2022, which is hereby incorporated by reference.

TECHNICAL FIELD

The present disclosure generally relates to recovery of memory subsystem data, and more specifically, relates to multiple memory subsystems recovering data of another memory subsystem cooperatively and in parallel.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to the coordination of multiple memory subsystems recovering data of another storage subsystem cooperatively and in parallel. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND, also referred to as not-and) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1" or combinations of such values. There are various types of cells, such as single-level cells (SLCs), multi-level cells (MLCs), triple-level cells (TLCs), and quad-level cells (QLCs). For example, an SLC can store one bit of information and has two logic states.

The capacities of memory subsystems, such as solid-state drives, continue to increase. The impact of a single memory subsystem failure, accordingly, continues to increase as well. Data protection techniques are employed to mitigate memory subsystem failures within a storage network. Computational overheads of modern data protection techniques, including calculations of exclusive-or (XOR) and/or erasure coding (e.g., Reed Solomon polynomials), can be significant for both encoding and decoding data. These protection techniques can be implemented as software storage stack-based solutions, e.g., in a storage services stack located on a host system. Disaggregated storage, separating the host system from memory subsystems, increases latency and network traffic overheads in addition to the computational overhead. Even when implemented locally, e.g., on a data processing unit or similar processing unit/controller on a per-storage-shelf basis, the centralization of encoding and decoding calculations adds to the already burdened storage services stack and increases network/switch bandwidth utilization. As a result, quality of service (QoS) can be significantly impacted.

Aspects of the present disclosure address the above and other deficiencies by having multiple memory subsystems perform the computations to recover data (user data and/or parity data) in a distributed and parallel fashion. A host, processing unit, or other controller distributes portions of the recovery effort to each of multiple memory subsystems. Each memory subsystem performs its portion of the erasure calculations to recover the data stored by a failed memory subsystem and writes the recovered data to a spare memory subsystem. As the memory subsystems operate in parallel, the recovery process takes less time it would using a conventional, centralized recovery. This results in improved network/switch efficiency and better QoS.

Figure 1:
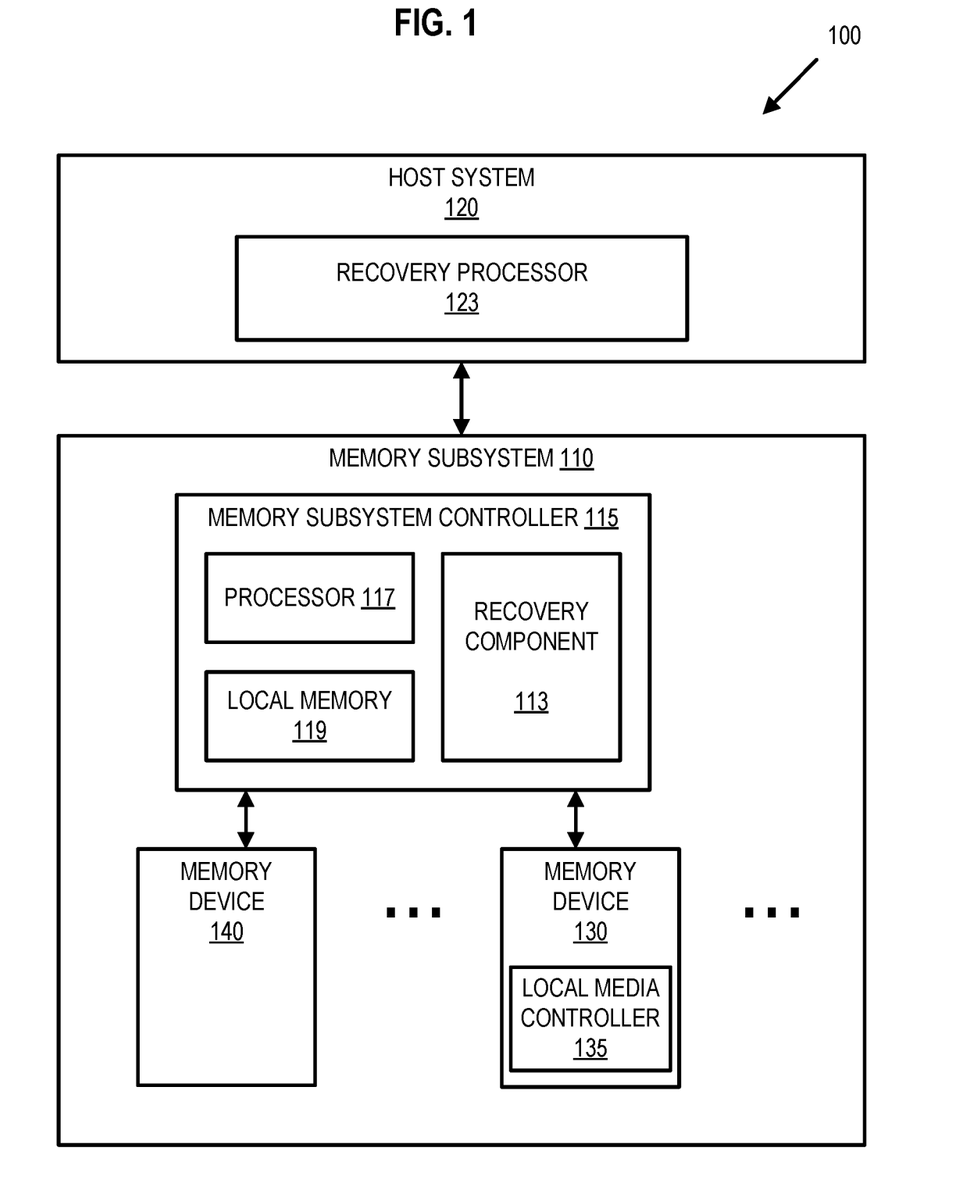
FIG. 1 illustrates an example computing system that includes a memory subsystem in accordance with some embodiments of the present disclosure.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, compute express link (CXL), universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM), static random access memory (SRAM), and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The host system 120 includes a recovery processor 123 that can orchestrate the recovery process by sending a script or other instructions to each memory subsystem 110 to perform a portion of the recovery. For example, a recovery script can be implemented in a high-level language that describes operations (per memory subsystem 110) to accomplish the recovery process. This can be implemented as a lightweight messaging protocol between the host system 120 and each participating memory subsystem 110. In another embodiment, the recovery processor 123 is external to the host system 120. For example, the recovery processor 123 can be a data processing unit (DPU), an infrastructure processing unit (IPU), or another controller that provides acceleration of data processing for a group of memory subsystems 110. Further details with regards to the operations of the recovery processor 123 are described below.

The memory subsystem 110 includes a recovery component 113 that can perform, in parallel with one or more other memory subsystems 110, a portion of the recovery of a failed memory subsystem 110. In some embodiments, the controller 115 includes at least a portion of the recovery component 113. For example, the controller 115 can include a processor 117 (processing device) configured to execute instructions stored in local memory 119 for performing the operations described herein.

The recovery component 113 can receive and carry out recovery instructions from the recovery processor 123. For example, the recovery component 113 can read data of a block stripe from other memory subsystems 110, perform the erasure calculations to recover the data of the block stripe stored by the failed memory subsystem, and write the recovered data to a spare memory subsystem. Additionally, the recovery component 113 can send recovery status messages to recovery processor 123 reporting recovery progress. The recovery component 113 can also receive and execute regeneration requests to prioritize recovery of portions of data. Further details with regards to the operations of the recovery component 113 are described below.

Figure 2:
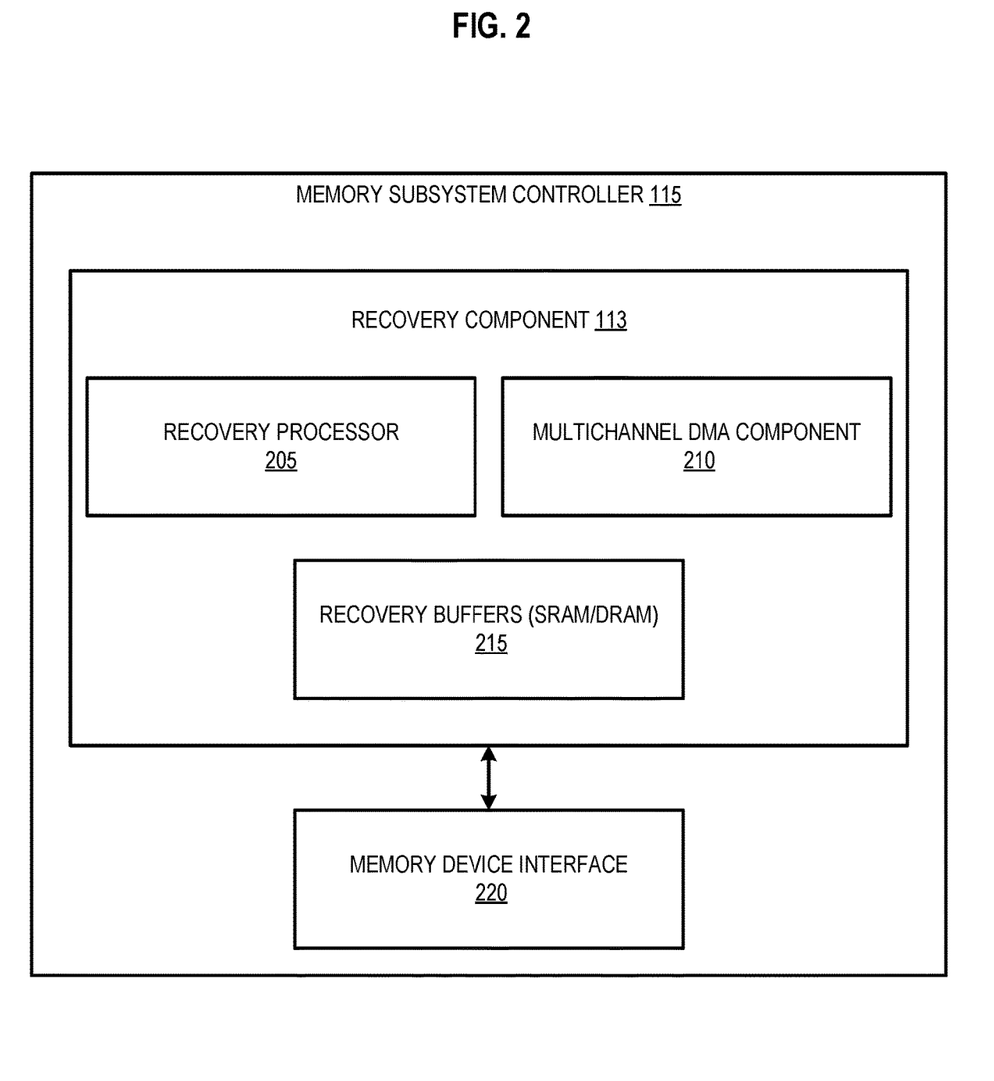
FIG. 2 illustrates an example of additional detail of a memory subsystem controller including a recovery component in accordance with some embodiments of the present disclosure.

FIG. 2 illustrates an example of additional detail of a memory subsystem controller 115 including a recovery component 113 in accordance with some embodiments of the present disclosure. The recovery component 113 includes a recovery processor 205. The recovery processor 205 performs the erasure calculations to recover data stored by a failed memory subsystem. For example, the recovery processor 205 performs XOR computations, matrix computations, Galois field multiplication, Reed-Solomon code computations, or another error correcting code or erasure code computation on data stored by operational memory subsystems to recover the data lost due to the failure of a memory subsystem.

The recovery component 113 further includes a multichannel direct memory access (DMA) component 210. The multichannel DMA component 210 performs read and write operations on the memory devices 130, 140 coupled to the memory subsystem controller 115 via multiple channels.

The recovery component 113 further includes a memory device interface 220. The memory device interface 220 is a high-speed computer bus providing access to the memory devices 130, 140 of the memory subsystem 110, access to other memory subsystems, and address translation servicing and caching. In one embodiment, the memory device interface 220 operates according to an interface standard, such as Peripheral Component Interconnect Express (PCIe).

Further details with regards to the operations of these components are described below.

Figure 3:
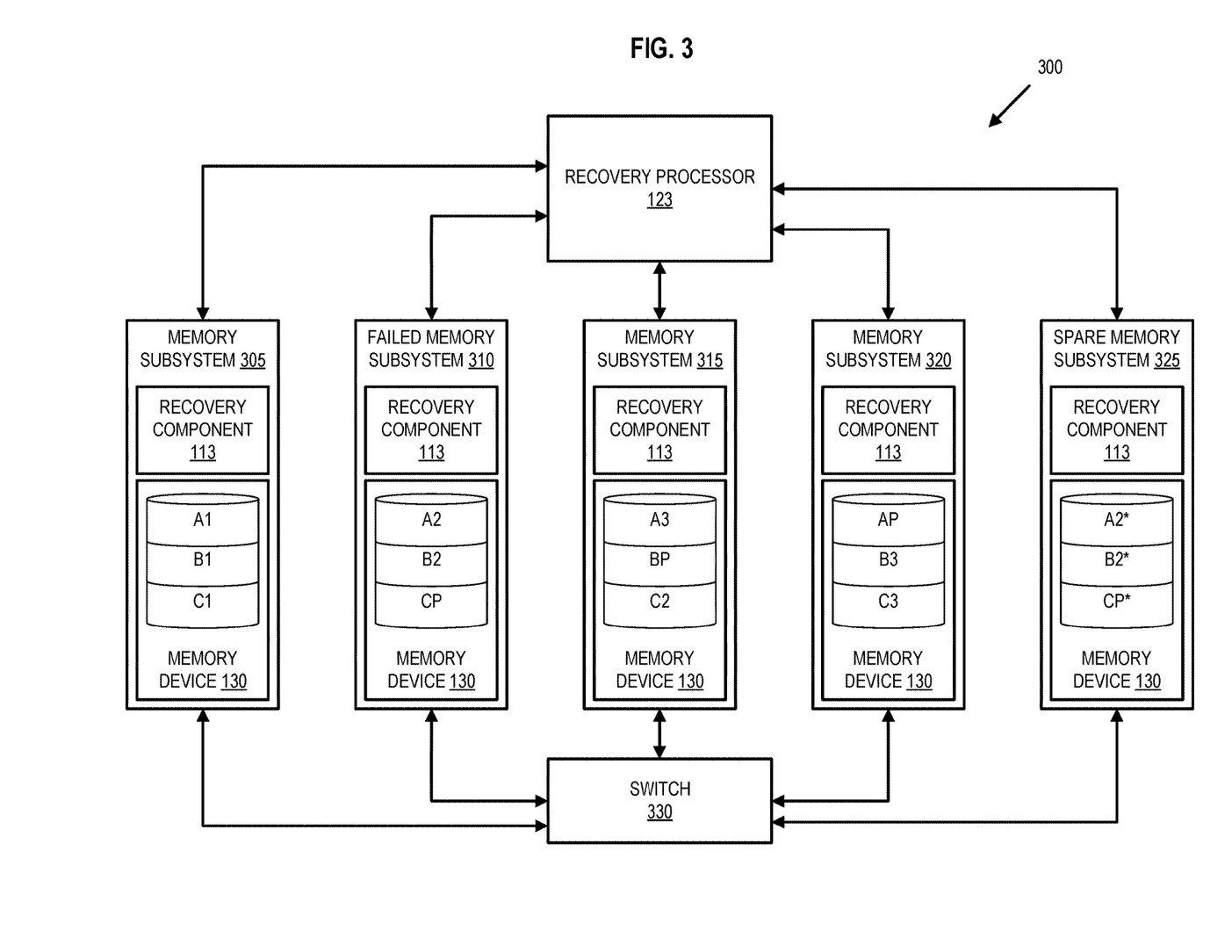
FIG. 3 illustrates another example computing system that includes memory subsystems in accordance with some embodiments of the present disclosure.

FIG. 3 illustrates another example computing system 300 that includes memory subsystems in accordance with some embodiments of the present disclosure. For example, each of the memory subsystems of the computing system 300 is similar to the memory subsystem 110 described above. For simplicity of description, however, the memory subsystems of the computing system 300 are each illustrated only with a recovery component 113 and a memory device 130. Other components that have been described above can also be included in each of the memory subsystems of the computing system 300. Additionally, each of the memory subsystems can have different amounts and/or types of memory devices 130 (the use of a common reference number is, again, for simplicity of illustration of an example).

The memory subsystems of the computing system 300 store block stripes, with a portion of each block stripe residing in a portion of the corresponding memory device 130. For example, memory subsystem 305 stores a user data portion of block stripe A, A1, a user data portion of block stripe B, B1, and a user data portion of block stripe C, C1. The failed memory subsystem 310 stored another user data portion of block stripe A, A2, another user data portion of block stripe B, B2, and parity/error correction data of block stripe C, CP. The memory subsystem 315 stores another user data portion of block stripe A, A3, parity/error correction data of block stripe B, BP, and another user data portion of block stripe C, C2. The memory subsystem 320 stores another user data portion of block stripe A, A3, parity/error correction data of block stripe B, BP, and another user data portion of block stripe C, C2. The spare memory subsystem 325 stores the recovered copies of user data portion of block stripe A, A2*, the user data portion of block stripe B, B2*, and the parity/error correction data of block stripe C, CP*. Examples of the cooperative recovery of this data is described below with reference to FIGS. 4-6. The memory devices 130 can store additional block stripes. Additionally, the computing system 300 can include additional memory subsystems, increasing the user data and/or parity/error correction data included in the block stripes. The illustrated example is for ease of explanation and does not limit embodiments to a particular number of memory subsystems, portions of user data, portions of parity/error correction data, organization of data across block stripes, sizes of portions of data striped across memory subsystems, etc.

The memory subsystems of the computing system 300 are coupled to a switch 330. In one embodiment, the switch 330 provides a peer-to-peer network to enable the memory subsystems to perform reads and writes between one another, e.g., in the recovery process, minimizing the impact on input/output (I/O) bandwidth for normal read and write operations. In another embodiment, this peer-to-peer traffic for the recovery process uses a portion of trunk bandwidth of another interface, such as memory device interface 220, leaving the remaining of the portion of the trunk for normal operations.

Figure 4:
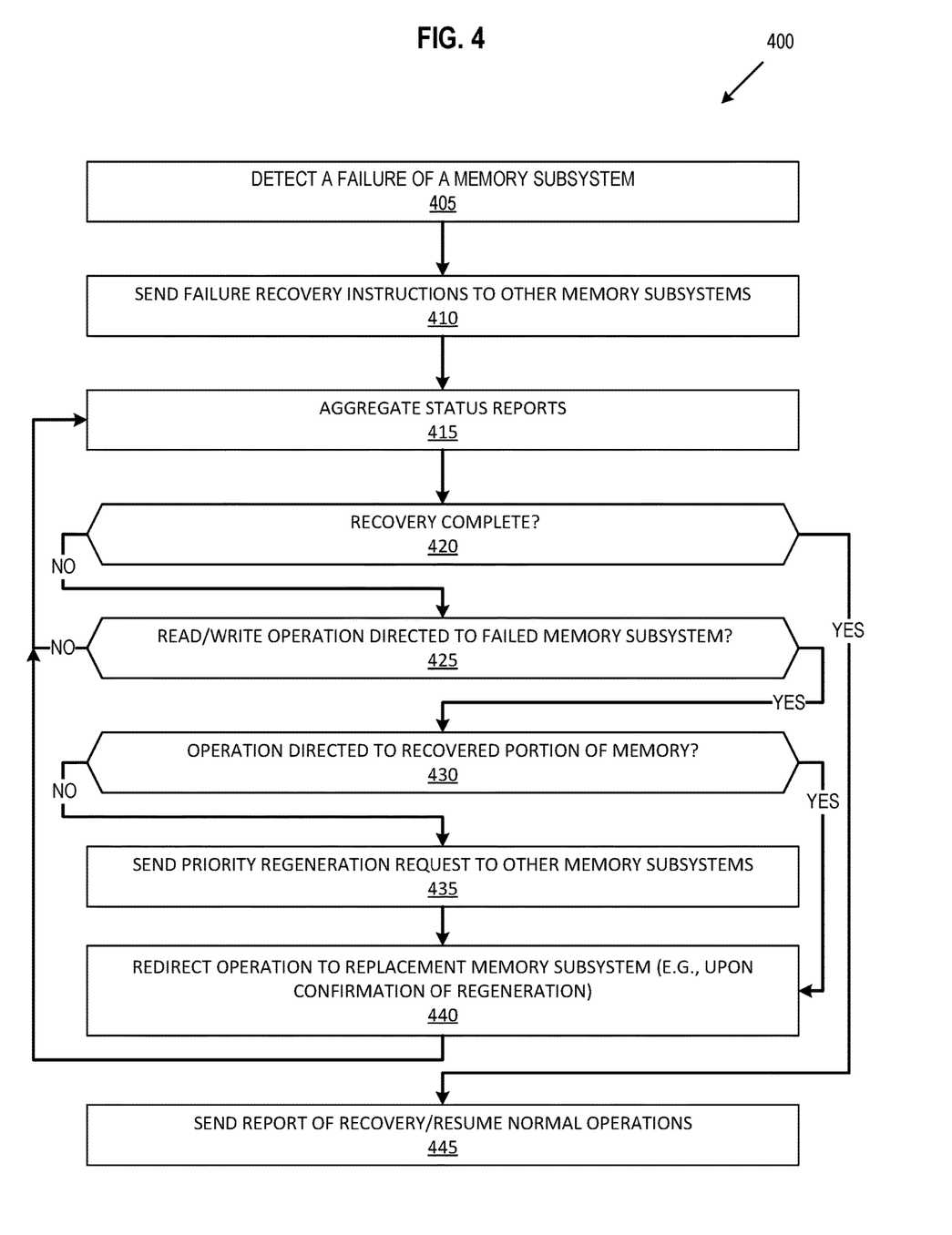
FIG. 4 is a flow diagram of an example method to orchestrate cooperative recovery of data of a failed storage subsystem in accordance with some embodiments of the present disclosure.

FIG. 4 is a flow diagram of an example method 400 to orchestrate cooperative recovery of data of a failed storage subsystem in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the recovery processor 123 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device detects a failure of a memory subsystem. For example, the recovery processor 123 detects a lack of a heartbeat signal, lack of a response from the failed memory subsystem 310, or another indicator that the memory subsystem 310 has failed.

At operation 410, the processing device sends failure recovery instructions to two or more of the other memory subsystems. For example, in response to detecting the failure, the recovery processor 123 accesses a map or other data structure to determine logical address ranges of data that was stored by the failed memory subsystem 310. In one embodiment, the failure recovery instructions are in the form of a script or another high-level language that describes operations per memory subsystem that will accomplish the recovery process.

The recovery processor 123 divides or otherwise apportions the address ranges (i.e., the data to be recovered) across the operational memory subsystems, such as memory subsystems 305, 315, and 320. In one embodiment, the recovery processor 123 also apportions data to be recovered to one or more spare memory subsystems, such as spare memory subsystem 325 that is to serve as the replacement of the failed memory subsystem 310.

In one embodiment, the recovery processor 123 apportions the data to be recovered across the memory subsystems equally (or nearly equally if the tasks are not equally divisible), e.g., using a round-robin or similar algorithm. In another embodiment, the recovery processor 123 apportions the data to be recovered across the memory subsystems unequally, e.g., apportioning the data recovery based on workload history, bandwidth, processing power, and/or other resources. In one instance, the spare memory subsystem 325 is apportioned a greater amount of the recovery effort because, until the spare memory subsystem 325 stores a substantial amount of the recovered data, fewer normal/non-recovery I/O operations are directed to the spare memory subsystem 325 than the other operational memory subsystems. As a result, the recovery process can have a less of an impact on QoS for, e.g., ongoing read and write operations directed to data stored on the operational memory subsystems.

At operation 415, the processing device aggregates status reports of the recovery process from the memory subsystems. For example, as the memory subsystems perform recovery operations, the recovery component 113 of each memory subsystem sends a status report message to the recovery processor 123. The status report can include indications of portions of memory recovered (e.g., since the last status report), recovery errors, responses to regeneration requests, etc.

At operation 420, the processing device determines if the recovery of data stored by the failed memory subsystem is complete. For example, the recovery processor 123 uses the aggregated status reports to determine if all data has been recovered and written to the spare memory subsystem 325. If the recovery of data stored by the failed memory subsystem is complete, the method 400 proceeds to operation 445. If the recovery of data stored by the failed memory subsystem is not complete, the method 400 proceeds to operation 425.

At operation 425, the processing device determines if a read or write operation (e.g., from a client or host system) is directed to data that was stored by the failed memory subsystem. For example, the recovery processor 123 can receive or internally generate a read or write operation for an application or process unrelated to the recovery process. If a read or write operation has not been directed to data that was stored by the failed memory subsystem, the method 400 returns to operation 415 to continue the aggregation of status reports. If a read or write operation has been directed to data that was stored by the failed memory subsystem, the method 400 proceeds to operation 430.

At operation 430, the processing device determines if the operation is directed to a portion of memory that has already been recovered. For example, the recovery processor 123 uses the aggregated status reports to determine data/address ranges that have been successfully recovered and written to the spare memory subsystem 325. If the operation is directed to a portion of memory that has already been recovered, the method 400 proceeds to operation 440. If the operation is directed to a portion of memory that has not yet been recovered, the method 400 proceeds to operation 435. Alternatively, if the recovery processor 123 determines that recovery of the data was attempted and failed (via an error message in a status report), the recovery processor 123 can respond to the I/O operation with an error message.

At operation 435, the processing device sends a regeneration request to the memory subsystems to prioritize recovery of the block stripe containing the data that is subject to the received read or write operation. For example, the recovery processor 123 sends the regeneration request to the memory subsystems 305, 315, 320, 325 and the memory subsystems 305, 315, 320, 325 prioritize recovery of the block stripe as described below with reference to FIG. 5.

At operation 440, the processing device redirects the I/O operation to the memory subsystem that is replacing the failed memory subsystem. For example, the recovery processor 123 forwards the I/O operation to the spare memory subsystem 325 to execute the read or write request (or the corresponding portion thereof) on the recovered data. In one embodiment, a regeneration request for a read operation results in the recovery memory subsystem returning data rather than the replacement/spare memory subsystem. For example, a read request for user data B2, which has yet to be recovered, can trigger the recovery processor 123 to transmit a regeneration request for block stripe B to the memory subsystem 315, which was tasked with the recovery of block stripe B. The regeneration request can include the read request so that, once the memory subsystem 315 has recovered user data B2, the memory subsystem 315 can both return the data B2 in response to the read request and write the data B2 to the spare memory subsystem 325.

At operation 445, the processing device sends a report of recovery completion and/or resumes normal operations. For example, the recovery processor 123 can transmit a recovery completion message to one or more host systems 120 and/or one or more memory subsystems 110 to indicate one or more of: that the recovery is complete, that a spare memory subsystem is in use, and/or a summary of errors that occurred during the recovery. The recovery processor 123 can resume normal operations and discontinue monitoring the recovery effort or otherwise dedicating resources to the recovery of data that was stored in the failed memory subsystem 310.

Figure 5:
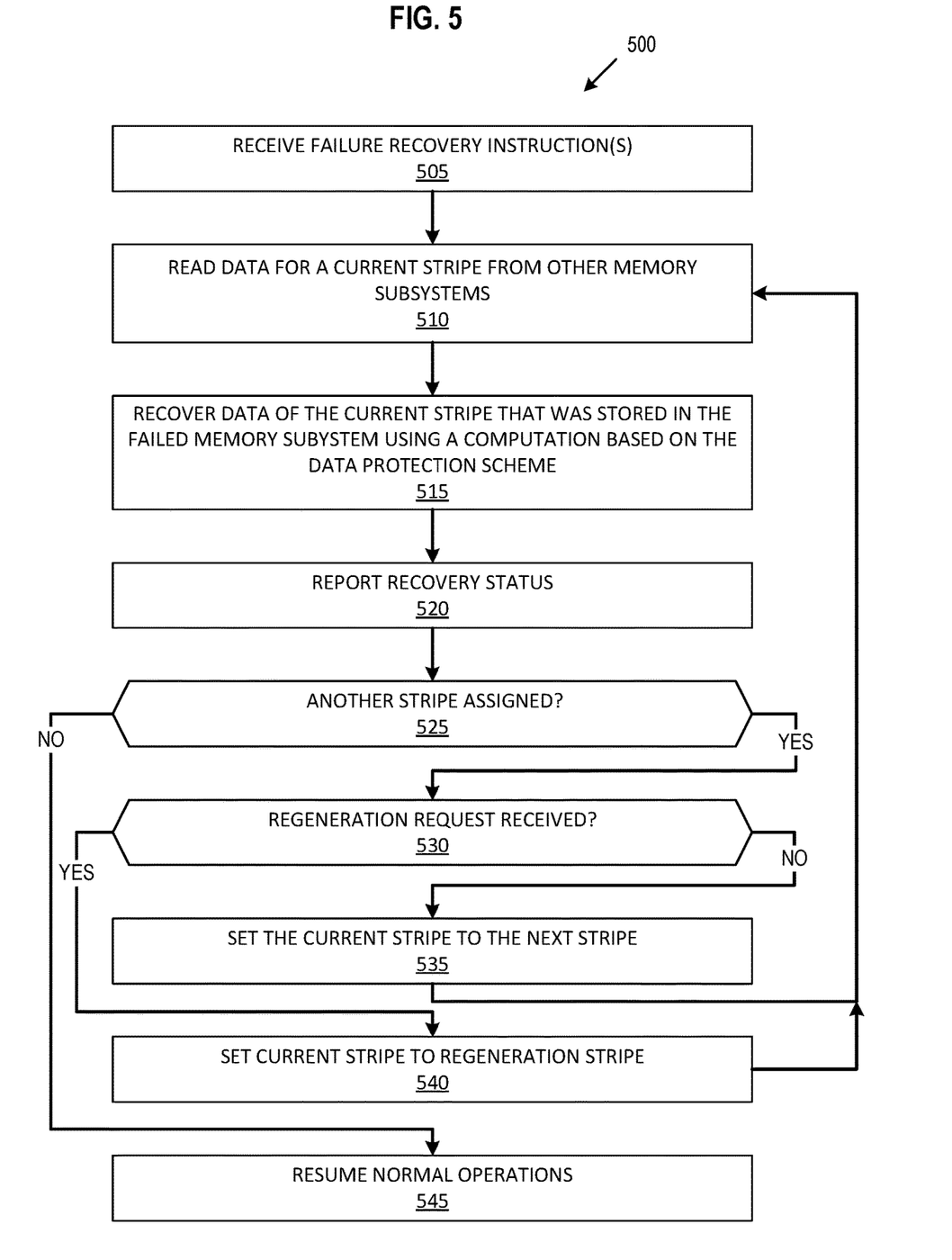
FIG. 5 is a flow diagram of an example method to cooperatively recover data of another storage subsystem in accordance with some embodiments of the present disclosure.

FIG. 5 is a flow diagram of an example method 500 to cooperatively recover data of another storage subsystem in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the recovery component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing device receives failure recovery instructions. For example, the recovery component 113 receives recovery instructions from the recovery processor 123 as described above with reference to operation 410.

At operation 510, the processing device reads data of the current block stripe from the operational memory subsystems. For example, if the memory subsystem 305 is tasked with recovery of block stripe A, the recovery component 113 of the memory subsystem 305 uses the switch 330 or memory interface 220 to read user data A3 from the memory subsystem 315 and parity data AP from the memory subsystem 320. Additionally, the recovery component 113 of the memory subsystem 305 can read user data A1 from its own memory device 130.

At operation 515, the processing device recovers the data of the current block stripe that was stored in the failed memory subsystem. Continuing the example above, the recovery component 113 of the memory subsystem 305 uses user data A1, user data A3, and parity data AP to recover the user data A2 via an error correction, erasure code, or other data protection computation. The recovery component 113 of the memory subsystem 305 writes the recovered user data A2* to the spare memory subsystem 325.

In one embodiment, the recovery component 113 selects the current block stripe in an order provided by the recovery processor 123. Alternatively, the recovery component 113 selects the current block stripe in an order of address values, randomly, based on a frequency of I/O requests directed to block stripes, etc. In one embodiment, the recovery component 113 divides time and/or processing resources between the recovery and processing of normal I/O operations. For example, the recovery component 113 can use time-division multiple access (TDMA) or another resource sharing scheme to allocate resources to recovering block stripe data tasked to the memory subsystem, responding to read requests from other memory subsystems for their recovery efforts, and normal I/O operations. While examples of recovery are described herein as being performed one stripe at a time, the memory subsystems can divide the recovery tasks into smaller or larger portions of memory.

At operation 520, the processing device reports the recovery status. For example, the recovery component 113 sends an indication of recovery success or error in the recovery of the current block stripe to the recovery processor 123. In one embodiment, the recovery component 113 processes an I/O request as a part of a regeneration request, as described above with reference to operation 440.

At operation 525, the processing device determines if another block stripe remains to be recovered. For example, the recovery component 113 determines if there is any remaining data to recover in the address range of the recovery instructions received from the recovery processor 123. If no other block stripe remains to be recovered, the method 500 proceeds to operation 545. If another block stripe remains to be recovered, the method 500 proceeds to operation 530.

At operation 530, the processing device determines if a regeneration request has been received. For example, the recovery component 113 can receive a regeneration request from the recovery processor 123 as described above with reference to operation 435. If a regeneration request has been received, the method 500 proceeds to operation 540. If a regeneration request has not been received, the method 500 proceeds to operation 535.

At operation 535, the processing device sets the current stripe to the next stripe. For example, the recovery component 113 selects the next block stripe for recovery according to an order as described above. The method 500 returns to operation 510 to continue recovery with the new current block stripe.

At operation 540, the processing device sets the current stripe to the stripe subject to the regeneration request. For example, the recovery component 113 prioritizes the recovery of the block stripe in the regeneration request to minimize the impact of recovery on QoS for normal I/O operations. As such, a regeneration request triggers the recovery component 113 to process the recovery of the regeneration block stripe out of the order described above. The method 500 returns to operation 510 to continue recovery with the new current block stripe.

At operation 545, the processing device resumes normal operations. For example, in response to determining no block stripes remain to be recovered, the recovery component 113 reallocates resource bandwidth that was used for reading, computing, and writing data in the recovery process to processing normal I/O operations.

Figure 6:
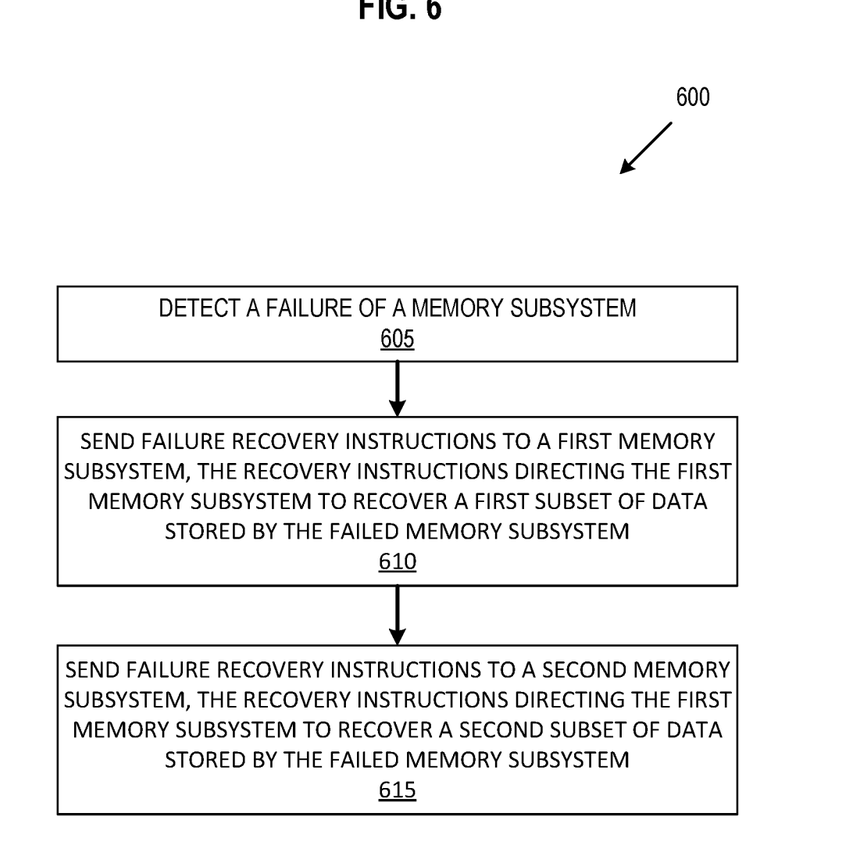
FIG. 6 is a flow diagram of another example method to orchestrate cooperative recovery of data of a failed storage subsystem in accordance with some embodiments of the present disclosure.

FIG. 6 is a flow diagram of another example method 600 to orchestrate cooperative recovery of data of a failed storage subsystem in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the recovery processor 123 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, the processing device detects a failure of a memory subsystem. For example, the recovery processor 123 detects via lack of a heartbeat signal, lack of a response, or another indicator that the memory subsystem 310 has failed.

At operation 610, the processing device sends failure recovery instructions to a first memory subsystem directing the first memory subsystem to recover a first subset of data stored by the failed memory subsystem. For example, in response to detecting the failure, the recovery processor 123 apportions an address range of data to be recovered to the memory subsystem 305 and sends a script or other instructions for the memory subsystem 305 to recover the corresponding data lost in the failure of the memory subsystem 310, as described above with reference to operation 410.

At operation 615, the processing device sends failure recovery instructions to a second memory subsystem directing the second memory subsystem to recover a second subset of data stored by the failed memory subsystem. For example, in response to detecting the failure, the recovery processor 123 apportions another address range of data to be recovered to the memory subsystem 315 and sends a script or other instructions for the memory subsystem 315 to recover the corresponding data lost in the failure of the memory subsystem 310, as described above with reference to operation 410. The first and second subsets of data differ from one another. For example, the first and second subsets of data are referenced by distinct address ranges.

Figure 7:
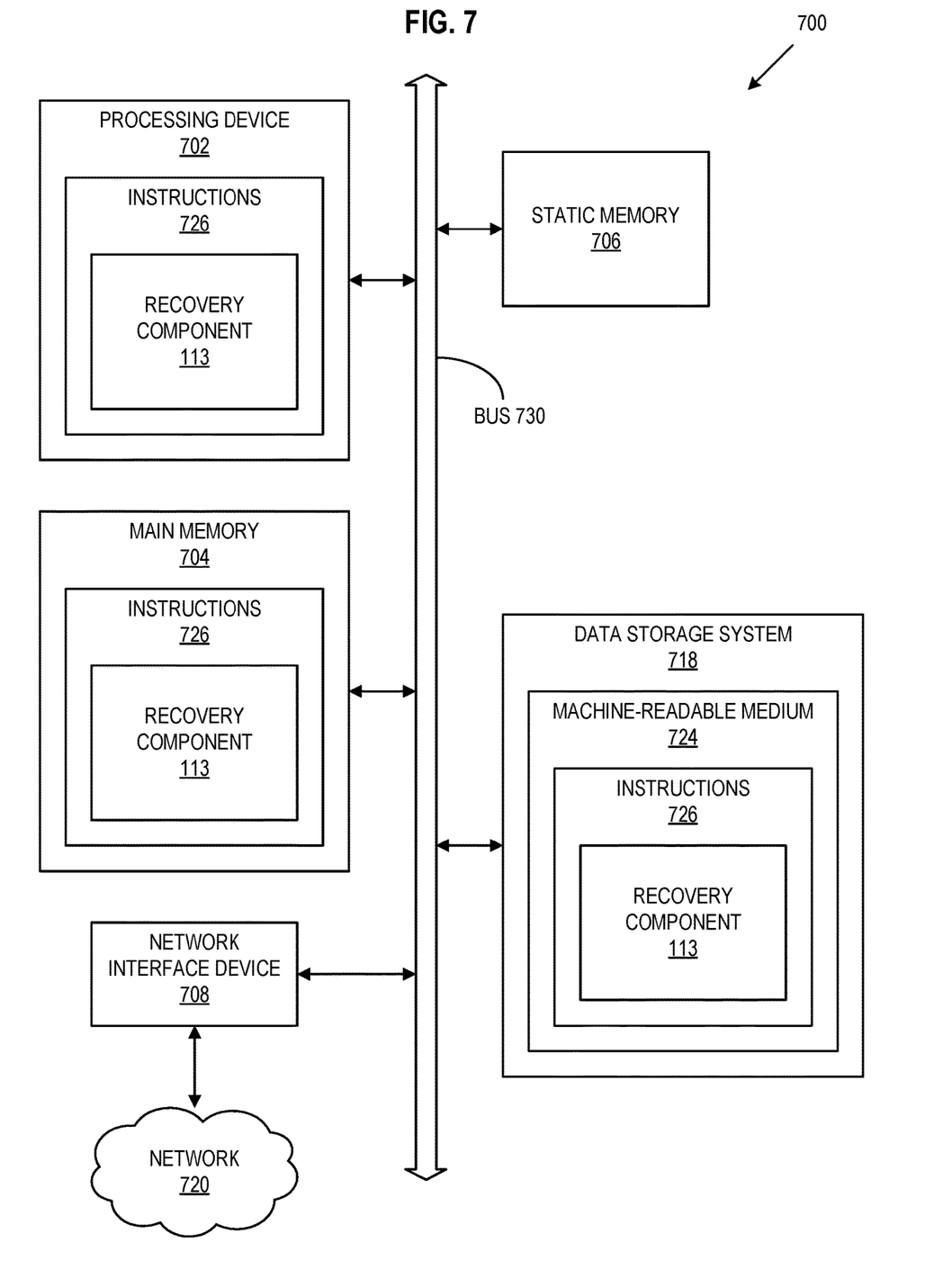
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the recovery component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, a hardware logic (accelerator), or the like (including a combination of one or more of the listed devices). The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory subsystem 110 of FIG. 1.

In one embodiment, the instructions 726 include instructions to implement functionality corresponding to a recovery component (e.g., the recovery component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115 and/or host system 120, may carry out the computer-implemented methods 400, 500, and 600 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving a first recovery instruction to recover a first subset of data stored by a first memory subsystem of a plurality of memory subsystems, wherein the first recovery instruction is received from a second memory subsystem and the second memory subsystem sends a second recovery instruction to a third memory subsystem of the plurality of memory subsystems, the second recovery instruction directing the third memory subsystem to recover a second subset of data stored by the first memory subsystem, the first and second subsets of data differing from one another;
reading data from one or more other memory subsystems of the plurality of memory subsystems;
recovering the first subset of data by performing a data protection computation on the data read from the one or more other memory subsystems; and
reporting a status of recovery to the second memory subsystem in response to recovering the first subset of data.

2. The method of claim 1, further comprising:
writing the recovered first subset of data to a spare memory subsystem.

3. The method of claim 2, wherein writing the recovered first subset of data to the spare memory subsystem is in response to receiving an instruction from the second memory subsystem and wherein the second recovery instruction further directs the third memory subsystem to write the recovered second subset of data to the spare memory subsystem.

4. The method of claim 2, wherein the second memory subsystem sends a third recovery instruction to the spare memory subsystem, the third recovery instruction directing the spare memory subsystem to rebuild a third subset of data stored by the first memory subsystem.

5. The method of claim 1, further comprising:
receiving a request from the second memory subsystem to prioritize recovery of data within the first subset of data, wherein the request to prioritize recovery of the data is in response to a read or write operation received prior to recovery of the first subset of data.

6. The method of claim 1, wherein the first subset of data is a portion of a stripe of data across multiple of the plurality of memory subsystems and the reading of data from the one or more other memory subsystems includes reading other portions of the stripe.

7. The method of claim 1, further comprising:
reallocating resource bandwidth to an internal read or write operation unrelated to recovery of data stored by the first memory subsystem in response to completing the recovery of the first subset of data.

8. A non-transitory computer-readable storage medium comprising instructions that, when executed by a processing device, cause the processing device to:
receive a first recovery instruction to recover a first subset of data stored by a first memory subsystem of a plurality of memory subsystems, wherein the first recovery instruction is received from a second memory subsystem and the second memory subsystem sends a second recovery instruction to a third memory subsystem of the plurality of memory subsystems, the second recovery instruction directing the third memory subsystem to recover a second subset of data stored by the first memory subsystem, the first and second subsets of data differing from one another;
read data from one or more other memory subsystems of the plurality of memory subsystems;
recover the first subset of data by performing a data protection computation on the data read from the one or more other memory subsystems; and
report a status of recovery to the second memory subsystem in response to recovering the first subset of data.

9. The non-transitory computer-readable storage medium of claim 8, wherein the processing device is further to:
write the recovered first subset of data to a spare memory subsystem.

10. The non-transitory computer-readable storage medium of claim 9, wherein writing the recovered first subset of data to the spare memory subsystem is in response to receiving an instruction from the second memory subsystem and wherein the second recovery instruction further directs the third memory subsystem to write the recovered second subset of data to the spare memory subsystem.

11. The non-transitory computer-readable storage medium of claim 9, wherein the second memory subsystem sends a third recovery instruction to the spare memory subsystem, the third recovery instruction directing the spare memory subsystem to rebuild a third subset of data stored by the first memory subsystem.

12. The non-transitory computer-readable storage medium of claim 8, wherein the processing device is further to:
receive a request from the second memory subsystem to prioritize recovery of data within the first subset of data, wherein the request to prioritize recovery of the data is in response to a read or write operation received prior to recovery of the first subset of data.

13. The non-transitory computer-readable storage medium of claim 8, wherein the first subset of data is a portion of a stripe of data across multiple of the plurality of memory subsystems and the reading of data from the one or more other memory subsystems includes reading other portions of the stripe.

14. The non-transitory computer-readable storage medium of claim 8, wherein the processing device is further to:
reallocate resource bandwidth to an internal read or write operation unrelated to recovery of data stored by the first memory subsystem in response to completing the recovery of the first subset of data.

15. A system comprising:
a plurality of memory devices; and
a processing device, operatively coupled with the plurality of memory devices, to:
receive a first recovery instruction to recover a first subset of data stored by a first memory subsystem of a plurality of memory subsystems, wherein the first recovery instruction is received from a second memory subsystem and the second memory subsystem sends a second recovery instruction to a third memory subsystem of the plurality of memory subsystems, the second recovery instruction directing the third memory subsystem to recover a second subset of data stored by the first memory subsystem, the first and second subsets of data differing from one another;
read data from one or more other memory subsystems of the plurality of memory subsystems;
recover the first subset of data by performing a data protection computation on the data read from the one or more other memory subsystems;
report a status of recovery to the second memory subsystem in response to recovering the first subset of data; and
write the recovered first subset of data to a spare memory subsystem.

16. The system of claim 15, wherein writing the recovered first subset of data to the spare memory subsystem is in response to receiving an instruction from the second memory subsystem and wherein the second recovery instruction further directs the third memory subsystem to write the recovered second subset of data to the spare memory subsystem.

17. The system of claim 15, wherein the second memory subsystem sends a third recovery instruction to the spare memory subsystem, the third recovery instruction directing the spare memory subsystem to rebuild a third subset of data stored by the first memory subsystem.

18. The system of claim 15, wherein the processing device is further to:
receive a request from the second memory subsystem to prioritize recovery of data within the first subset of data, wherein the request to prioritize recovery of the data is in response to a read or write operation received prior to recovery of the first subset of data.

19. The system of claim 15, wherein the first subset of data is a portion of a stripe of data across multiple of the plurality of memory subsystems and the reading of data from the one or more other memory subsystems includes reading other portions of the stripe.

20. The system of claim 15, wherein the processing device is further to:
reallocate resource bandwidth to an internal read or write operation unrelated to recovery of data stored by the first memory subsystem in response to completing the recovery of the first subset of data.

\* \* \* \* \*